R. A. KELLY.

CAR-COUPLING.

No. 7,629. Reissued April 24, 1877.

ATTEST.

W. C. Corlies

E. S. Lloyd

INVENTOR.

Richard A Kelly

By Johnson & Thacher

Attys.

UNITED STATES PATENT OFFICE.

RICHARD A. KELLY, OF MANCHESTER, IOWA.

IMPROVEMENT IN CAR-COUPLINGS.

Specification forming part of Letters Patent No. 181,947, dated September 5, 1876; reissue No. 7,629, dated April 24, 1877; application filed February 26, 1877.

*To all whom it may concern:*

Be it known that I, RICHARD A. KELLY, of Manchester, in the county of Delaware and State of Iowa, have invented a new and Improved Car-Coupler; and I do hereby declare that the following is a full, clear, and exact description of the same.

This invention relates to automatic car-couplers; and it consists in attaching the coupling devices to a pivoted evener, or vibrating bar, to adapt it to couple on a curve as well as anywhere else; and it further consists in supporting the coupling devices upon bearings connected together, so that their front ends will vibrate vertically in opposite directions; and it also consists in the special devices used in combination with the coupling apparatus attached to the evener, and suspended to facilitate the operation of the same, all as hereinafter specified.

Figure 2:
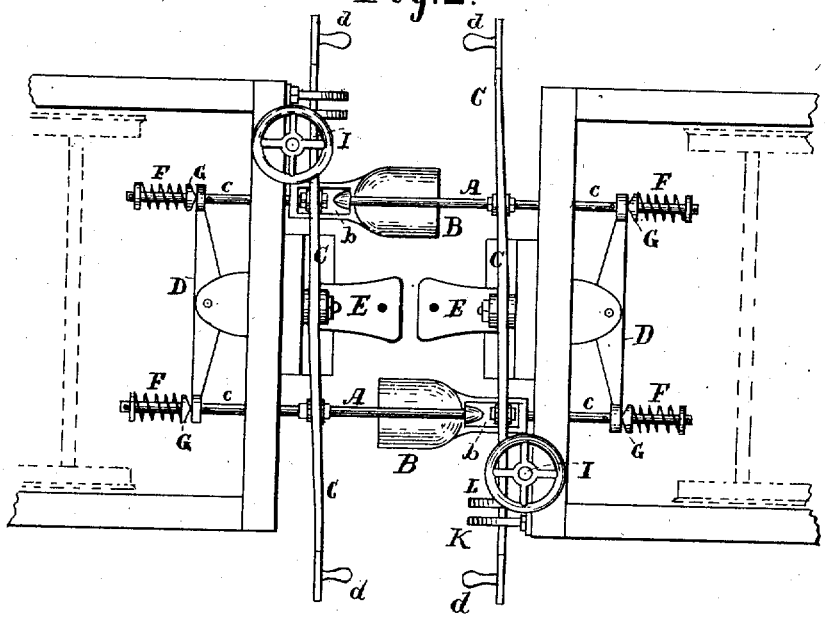

I also make reference to division A, filed simultaneous with the application for a patent, of which this is an amended specification, for the description of a modified form of my invention. I attach a draw-head to one end of the evener, and a suitable coupling-bar at the other end, so that each will have opposite to it a suitable coupling-bar and draw-head, to which to couple whenever two cars come together, as shown in Fig. 2; but the object of attaching the coupling device to an evener is to allow one to be thrown back and the other correspondingly forward, to accomplish the coupling when the cars stand upon a curve. I also suspend the front ends of the draw-head and coupling-bar from a pivoted cross-piece, so as to throw the draw-bar down while the coupling-bar is raised, to facilitate the uncoupling, and they can also be vibrated to such position as not to couple when the cars come together.

Figure 1:
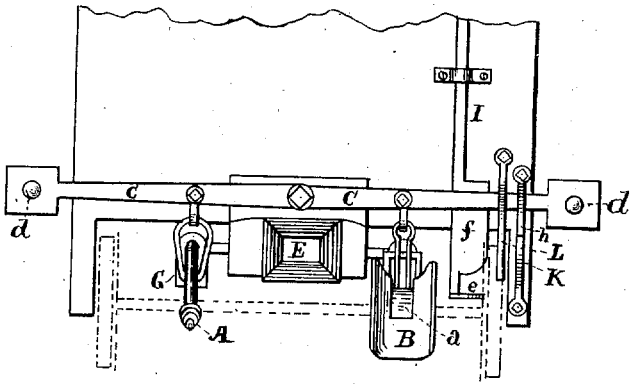
Figure 3:
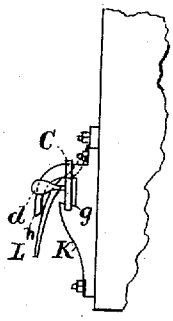

In the accompanying drawing, forming part of this specification, Figure 1 is a front elevation of the coupling devices as applied to a car, and in position for engaging with corresponding devices attached to another car. Fig. 2 is a plan view of the apparatus, complete, showing the respective parts engaged. Fig. 3 is a detail view, showing the lever supported upon the catch or bracket.

In this instance I employ arrow-head coupling-bars A and draw-heads B, the latter having a scooped-shaped mouth, which is cut away on the upper side, and provided with a vertical notch or open slot, *a*, leading into an enlarged cavity or chamber, *b*, Fig. 2, the latter being designed to receive the heads of the said bars A The bars and draw-heads are suspended free at the front end from the levers C, and their shanks *c* pass through eyes formed on the ends of an evener or vibrating bar, D, pivoted in rear of the ordinary buffers E, and are encircled by spiral springs F, which serve to relieve the shock due to sudden application of traction by the locomotive.

In passing around curves the evener D will assume a greater or less angle to the shanks *c* of the coupling-bars and draw-heads, thus subjecting the springs F to unequal pressure on their respective inner and outer sides. To provide a bearing for the said springs, which shall remain at right angles to the shanks *c*, whatever may be the inclination of the evener thereto, I provide weighted washers G, having an angle-shaped back and flat or plain face. The object of weighting the washers is to cause them to maintain a vertical position, for if the angle of the back were to assume a horizontal position it is obvious the face of the washers would then be inclined at the same angle as the evener, and, consequently, fail of performance of their function.

The levers C are pivoted at their middle to the ends of the car, directly above the ordinary buffers E, and the ends of the same which project beyond the sides of the car are enlarged or broadened, and will, in practice, be painted white, or with some other easily-distinguished color, in order that the operator may the more readily discover when any one of the levers is out of line with the others, and thereby know when any one of the several couplings of a train is not properly made. I also attach handles *d* to these broadened ends, to facilitate the operation of the levers by an operator standing at the side of the car. The levers C may also be operated from the platform or top of a box-car by means of a sliding and rotating rod, I, having a hook or arm, *e*, at its lower end to raise the lever, and a flange or wing, *f*, to displace it from the bracket or support K. The latter has a shoulder, *g*, and hook *h*, the one to support the lever, and the other to prevent it being raised too high. A spring, L, serves to hold the lever supported on the shoulder of the bracket.

When the lever is horizontal the draw-head and coupling-bar supported therefrom are also held horizontal, and in position for coupling with those of another car.

When the lever is detached from the bracket K the weight of the draw-head overbalances the coupling-bar, and effects the uncoupling of the cars, the draw-head in such case dropping, and the coupling-bars rising and freeing themselves from the open slots *a* in the same.

When two cars come together the arrow-heads of the coupling-bars are centered by the large concavity of the draw-heads, and also guided to their place, so as to engage with the shoulders of the open slot *a*.

Having thus described my invention, what I claim, and desire to obtain by Letters Patent, is—

1. The evener D and the coupling-bars and draw-heads A and B, attached to the ends thereof, so as to vibrate with the evener, as and for the purposes specified.

2. The draw-bars and coupling-heads A and B, connected to a car, making a double coupling, and suspended from a vibrating cross-piece for raising and lowering their front ends, substantially as specified.

3. The combination of the weighted angle-backed washers with the springs, evener, and coupling-bars and draw-heads, as shown and described, for the purpose specified.

4. The combination of the levers C, the coupling-bars, and draw-head supported therefrom, the sliding and rotating rod I, having arm *e* and wing *f*, and the bracket K, constructed with hook and shoulder, as shown and described, for the purpose specified.

RICHARD A. KELLY.

Witnesses:
L. A. BUNTING,
E. S. LLOYD.